United States Patent [19]

Ho

[11] 4,204,244
[45] May 20, 1980

[54] ELECTROMECHANICAL PRESSURE TRANSDUCER

[75] Inventor: Roland K. Ho, McHenry, Ill.

[73] Assignee: Motorola, Inc., Schaumburg, Ill.

[21] Appl. No.: 871,273

[22] Filed: Jan. 23, 1978

[51] Int. Cl.$^2$ .............................................. H01G 7/00
[52] U.S. Cl. ..................................... 361/283; 361/275
[58] Field of Search .................. 361/283, 275; 73/724, 73/718; 179/111 R

[56] References Cited

U.S. PATENT DOCUMENTS

| | | | |
|---|---|---|---|
| 3,118,979 | 1/1964 | Sessler | 361/283 X |
| 3,405,559 | 10/1968 | Moffatt | 361/283 |
| 3,715,638 | 2/1973 | Pozye | 361/283 |
| 3,750,476 | 8/1973 | Brown | 73/724 |
| 3,993,939 | 11/1976 | Slavin | 361/283 |
| 4,064,550 | 12/1977 | Dias | 361/283 |

*Primary Examiner*—E. A. Goldberg
*Attorney, Agent, or Firm*—Phillip H. Melamed; James W. Gillman; Donald J. Lisa

[57] ABSTRACT

An improved ceramic capacitive pressure sensor adaptable for use in automobiles is disclosed. The pressure sensor comprises a thin flexible diaphragm disc having a capacitor electrode deposited on it. A thick cylindrical base substrate has a top surface with a second capacitor electrode deposited thereon and the diaphragm is bonded to the top surface of the base substrate by an annular glass ring such that the first and second electrodes are separated from each other and face each other directly across an air gap. The diaphragm, the top surface of the base substrate and the annular glass ring form an internal cavity in which a reference vacuum is stored. In response to pressure changes outside of this cavity, the diaphragm will flex and thereby change the capacitance created by the first and second electrodes. At least one channel portion is provided in the base substrate top surface which opens into the cavity storing the reference vacuum. This improves the electrical and mechanical characteristics of the pressure sensor. The diaphragm electrode is substantially larger than the base electrode and extends substantially over all of the central portion of the diaphragm within the glass annular ring and in this manner the electrode acts as a shield against conductive elements which are exterior to the internal cavity and are adjacent to the thin diaphragm. Also, a large electrode is provided on the diaphragm opposite to the diaphragm electrode, this large electrode being coupled to a metallic housing through a conductive gasket to obtain a similar shielding effect.

3 Claims, 3 Drawing Figures

ELECTROMECHANICAL PRESSURE TRANSDUCER

BACKGROUND OF THE INVENTION

The present invention relates generally to the field of electromechanical pressure sensors and more particularly to the field of ceramic capacitive pressure transducers. Ceramic capacitive pressure transducers are known and generally comprise parallel plate capacitor electrodes separated by an air gap wherein the spacing between the parallel plate electrodes is altered in response to a sensed pressure thereby changing the capacitance created by these electrodes. Generally, one capacitor electrode plate is deposited on a top end surface of a relatively thick cylindrically shaped ceramic base substrate while the other capacitor electrode is deposited on a relatively thin disc-shaped ceramic pressure sensing diaphragm. An annular glass insulating ring is deposited on the peripheral portion of the base substrate top surface and is used to bond the diaphragm to the base substrate as well as to space the diaphragm electrode a predetermined distance away from the base substrate electrode. Typically, the diaphragm, the annular glass ring and the base substrate are assembled into a sandwich type structure and then heated to form an integral assembly such that the capacitor electrodes are spaced apart by a predetermined distance totally dependent upon the thickness of the annular glass ring. Generally, a vacuum entryway hole is provided through the base substrate, and through this hole a predetermined reference vacuum pressure is applied to an air cavity formed by the diaphragm, the annular glass ring and the base substrate. Subsequently, the vacuum entryway is sealed so that the internal cavity will maintain (store) a predetermined reference vacuum pressure. By applying various degrees of pressure to the exterior of the capacitive pressure transducer, the transducer diaphragm is flexed by predetermined amount and this results in changing the capacitance created by the capacitor electrodes since the flexing of the diaphragm changes the spacing between the electrodes. Thus by monitoring the capacitance created by the electrodes, the ceramic capacitor transducer will produce an electrical signal related to the magnitude of the exterior pressure applied to the diaphragm as compared to the magnitude of the reference vacuum pressure. Such transducers are readily adaptable for sensing vacuum pressures generated by automobile internal combustion engines.

Typically, the nominal distance between the base and diaphragm capacitor electrodes is very small so that small changes in exterior pressure will result in relatively large changes in the capacitance created by these electrodes. In prior art ceramic capacitor transducers of this type, the top surface of the base substrate, as well as the diaphragm surface on which the diaphragm electrode is deposited, are substantially planar. Because of this and because the nominal distance between the electrodes has to be kept relatively small, the volume of the internal cavity which stores the reference vacuum pressure is very small. This results in these prior art capacitive transducers having relatively short life times whenever any appreciable leakage rates for the internal cavity exist. Also, since previous ceramic capacitive transducers have base substrates which are substantially solid, except for a narrow vacuum entryway hole, the base capacitor electrodes is surrounded with ceramic material having a high dielectric constant, and the end result is that the capacitor is much more susceptible to capacitive fringing effects. In addition, prior art capacitive transducers encounter capacitive fringing problems due to the effect of conductive surfaces or particles which are located exterior to the internal cavity but close to the thin flexible diaphragm. These conductive surfaces or particles create variable additional coupling between the capacitor electrodes and therefore tend to make these capacitive pressure sensors unrealiable in that a fixed value of capacitance would not always be generated in response to a fixed value of external pressure being applied to the diaphragm.

SUMMARY OF THE INVENTION

An object of the present invention is to provide an improved electromechanical pressure sensor which overcomes the aforementioned deficiencies.

A more specific object of the present invention is to provide an improved capacitive pressure transducer which is less susceptible to fringing effects caused by conductive surfaces and particles exterior to the pressure transducer.

According to the present invention an improved pressure transducer having a pressure displaceable diaphragm is provided in which the improved transducer is less susceptible to the presence of conductive elements adjacent to a pressure sensing displaceable diaphragm. The transducer comprises; base substrate means having top and bottom surfaces; flexible diaphragm means having a planar central portion and a peripheral portion; and mounting means for mounting said peripheral portion of said diaphragm means to said base substrate top surface, said mounting means, said diaphragm planar central portion and said substrate top surface forming an internal cavity, said diaphragm central portion being displaceable with respect to said top surface in response to pressure changes to thereby alter the electrical characteristics of the transducer and wherein the diaphragm has a guard electrode means extending over substantially all of said central portion of said diaphragm for shielding the transducer against conductive elements exterior to the internal cavity and located adjacent to the flexible diaphragm. Basically the present invention also contemplates providing a guard electrode over substantially all of an inner planar portion of a capacitive transducer diaphragm. The ground electrode means is substantially larger than a capacitance electrode on the base substrate and this minimizes the variable effects of conductive elements exterior to the pressure transducer assembly. Also, a large electrode is provided on the diaphragm opposite to the diaphragm electrode, this large electrode being coupled to a metallic housing through a conductive gasket to obtain a similar shielding effect.

BRIEF DESCRIPTION OF THE DRAWINGS

For a more complete understanding of the invention reference should made to the drawings, in which.

DESCRIPTION OF THE PREFERRED EMBODIMENT

Figure 1:
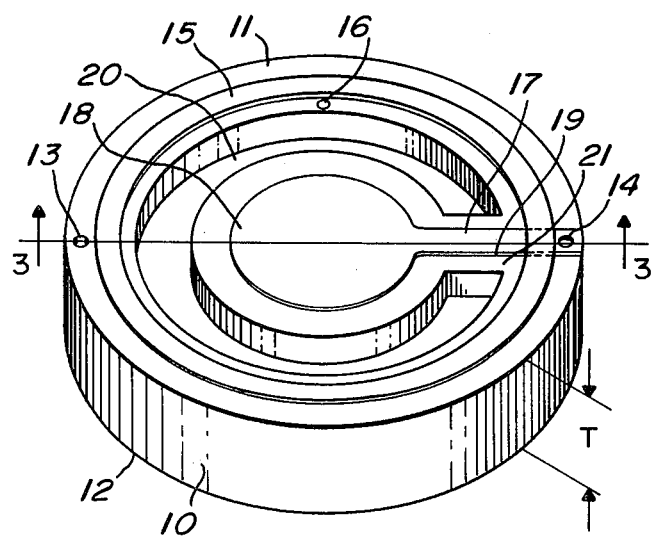
FIG. 1 is a perspective view of a metallized base substrate of a ceramic capacitive pressure transducer.

Referring to FIG. 1, a relatively thick cylindrically shaped ceramic base substrate 10 of a ceramic capacitive pressure transducer is illustrated. The base substrate 10 has a thickness T, a substantially circular top end surface 11, a substantially planar circular bottom end surface 12 and through holes 13 and 14 located along a planar annular peripheral portion of the circular top surface 11 and extending from the surface 11 to the surface 12. An annular ring 15 of insulating glass material is provided on the peripheral portion of the top surface 11. Within this glass annular ring, a vacuum entryway through hole 16 is provided and extends from the top surface 11 to the bottom surface 12. A metallic electrode area 17 is provided on the top surface 11 and comprises a substantially circular metallization portion 18 located within the annular ring 15 and a radially extending finger portion 19 extending from the circular electrode portion 18, underneath the glass insulating ring 15 to the through hole 14. A generally C-shaped channel 20 having a depth D (shown in FIG. 3) opens onto the top surface 11 and is positioned within said annular glass ring 15 such that it surrounds the circular electrode portion 18 and such that the radially extending finger 19 passes through the open portion 21 of the C-shaped channel 20. The electrode portions 18 and 19 are deposited on coplanar portions of the surface 11 which are also coplanar with the planar annular peripheral portion of the surface 11.

Figure 2:
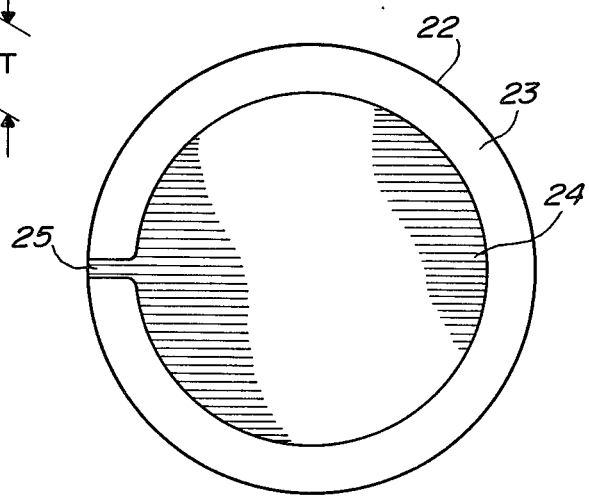
FIG. 2 is a plane view of a metallized ceramic diaphragm of a ceramic pressure transducer.

FIG. 2 illustrates a relatively thin ceramic disc 22 which functions as a diaphragm means for a ceramic capacitor transducer. The disc 22 has a planar circular surface 23 upon which a circular metallization area 24 is deposited, the diameter of the circular metallization 24 being substantially greater than the diameter of the circular metallization 18 on the base substrate 10. The metallization 24 extends over substantially all of a central portion of the surface 23 and a radial finger projection of metallization 25 extends from the circular area 24 radially outward into an annular peripheral portion of the surface 23 which surrounds the metallization 24.

Figure 3:
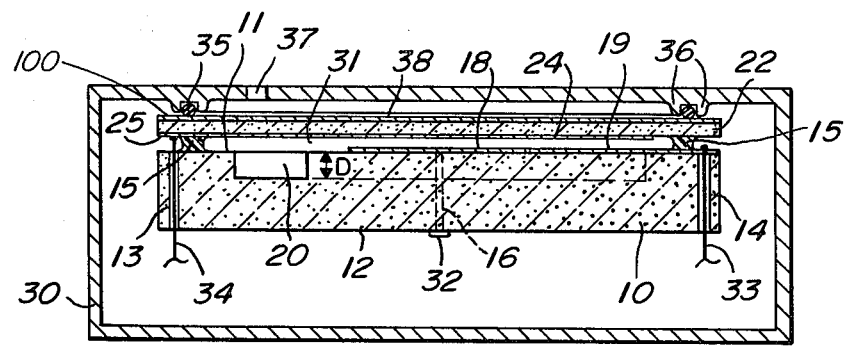
FIG. 3 is a cross-sectional view of a ceramic capacitive pressure transducer mounted in a housing and utilizing the components shown in FIGS. 1 and 2.

FIG. 3 illustrates an improved pressure transducer assembly which comprises the base substrate 10 illustrated in FIG. 1 and the diaphragm disc 22 illustrated in FIG. 2, assembled together and mounted in a generally rectangular in cross section transducer housing. Identical reference numbers are used to identify components in FIG. 3 which correspond to the components shown in FIGS. 1 and 2.

Basically, the diaphragm disc 22 is mounted to the base substrate 10 by the annular glass ring 15 bonding the peripheral portion of the surface 23 surrounding the metallization 24 to the annular peripheral portion of the base substrate surface 11. The annular glass ring 15, the planar central portion of the diaphragm surface 23 within the annular glass ring 15 and the top surface 11 of the base substrate 10 within the annular glass ring 15 form an internal cavity 31, and the vacuum entryway 16 extends from the bottom surface 12 of the base substrate through the base substrate into the cavity 31. A sealing structure 32 is present on the surface 12 and effectively seals the vacuum entryway 16 which opens onto the surface 12 such that the cavity 31 is essentially air tight. This occurs since the diaphragm disc 22 was bonded to the base substrate 10 by assembling the components as shown in FIG. 3 and then subjecting the assembly to a high temperature at which the glass annular ring 15 softened and thereby bonded the disc 22 to the substrate 10 with a substantially hermetic seal.

A reference vacuum pressure is stored in the cavity 31 by applying a vacuum to this cavity through the vacuum entryway 16 and subsequently sealing this entryway by the sealing means 32. In this manner, the cavity 31 is maintained at a vacuum reference pressure which results in flexing the diaphragm disc 22 such that a predetermined spacing exists between the electrode metallizations 18 and 24. When various pressures are applied exterior to the cavity 31 of the pressure transducer comprising the diaphram 22 and the base substrate 10, these various pressures will cause the disc 22 to flex and thereby slightly increase or decrease the spacing between the electrode metallizations 18 and 24. This in turn results in changing the capacitance represented by these two electrode metallizations and it is this capacitance change which is monitored by not shown electrical circuitry to produce an indication of the magnitude of the external pressure being applied to the diaphragm disc 22.

FIG. 3 illustrates that a first external electrical connection lead 33 is inserted through the peripheral through hole 14. It is contemplated that this external lead will be connected by some suitable conductive means to the finger projection metallization 19. Thus lead 33 represents the external lead connection to the metallization 18 which serves as one electrode of a parallel plate capacitor. Similarly, an external lead 34 is contemplated as passing through the peripheral through hole 13 such that it will electrically contact the radial finger metallization 25 of the diaphragm disc 22. In this manner, the external lead 34 will be connected to the metallization 24 that serves as the other electrode of a parallel plate capacitor.

The transducer comprising the flexible diaphragm 22 and the base substrate 10 is contemplated as being mechanically mounted in some manner within the transducer housing 30. In FIG. 3, one such mounting is illustrated in which the outer peripheral area of the disc 22 rests on a circular rubber O-ring 35 which is held in place by shoulders 36 formed on the interior wall of the housing 30. A through hole 37 is provided in the housing 30 and the housing, the O-ring 35 and the diaphragm disc 22 essentially formed an exterior cavity 38 to which various pressures are applied via the opening 37. It is these various pressures which exist in the cavity 38 that are sensed by the pressure transducer. Thus the capacitance created between the external leads 33 and 34 represents a measure of the various pressures applied to the cavity 38 with respect to the vacuum reference pressure stored in the internal cavity 31.

Preferably, the metallizations 18, 19, 24 and 25 are screen printed onto the ceramic base substrate 10 and the ceramic disc 22, respectively. In addition, the annular glass ring 15 is also contemplated as being screen printed onto the surface 11 of the base substrate 10. Preferably, the annular glass ring 15 will comprise a thick film glass paste which contains glass particles that will soften at a moderately high temperature and thereby bond the peripheral portion of the disc 22 to the annular peripheral portion of the surface 11 of the base substrate 10. Any type of convenient sealing mechanism can be used for the sealing means 32 since the function of this means is just to close off the vacuum entryway 16 after an appropriate reference vacuum pressure has been applied to the cavity 31.

Providing the base substrate 10 with the C-shaped channel 20 which opens onto the surface 11 essentially increases the total volume available for the internal cavity 31. This means that the lifetime of the pressure sensor will be increased since the cavity 31 can now maintain a reference vacuum pressure for a substantially longer period of time despite any pressure leakage through the substrate 10, the annular glass ring 15 or the ceramic diaphragm 22. In addition, providing the channel 20 around the circular electrode area 18 will reduce the fringing field created at the edge of this electrode. This occurs because now the electrode 18 is proximately surrounded by the gap created by the channel 20 rather than being surrounded by a ceramic material which would typically have a high dielectric constant. The ceramic material preferably used for the base 10 and disc 22 of the present invention is alumina ($Al_2O_3$) which has a dielectric constant of 9.

The fact that the diaphragm electrode area 24 is substantially greater than the base substrate electrode area 18 produces a shielding effect in which conductive elements that are located exterior to the cavity 31 but still somewhat adjacent to the thin diaphragm 22 will now have a minimum effect on the capacitance created by the capacitor electrodes 18 and 24. If the capacitor electrodes were of substantially equal size, then a substantial fringing field would exist at the edges of the capacitor electrodes and conductive contaminants located adjacent to the diaphragm 22 and exterior to the cavity 31 would have parasitic capacitive coupling effects between the capacitor electrodes and thereby create a variable and unpredictable capacitance reading. For the typical housing of the pressure transducer illustrated in FIG. 3, it is likely that water droplets may be present in the cavity 38. The presence of these droplets would thereby severely effect the capacitance generated by the plates 24 and 18 unless the effect of these contaminants was shielded against. The present invention provides this shielding by essentially masking the effect of conductive surfaces or particles located adjacent to the diaphragm 22 but exterior to the cavity 31.

A shielding effect similar to that produced by having the capacitor electrode 24 substantially larger than the electrode 18 can be produced by having the electrodes 24 and 18 substantially the same size but coating the planar circular surface of the disc 22 bordering on the cavity 38 with a conductive metallization 100, such as graphite or a thick film metallization. This exterior conductive metallization could then be coupled to the housing 30, which would preferably be metallic, by making the rubber O-ring 35 also conductive and thereby function as a conductive gasket. In this manner the exterior electrode on the disc 22 bordering the cavity 38 would now provide the shielding effect produced by the oversize electrode area 24 shown in FIG. 3. Using either of these two techniques, an effective shielding can be provided such that variable conductive contaminants which may be present in the cavity 38 will have a minimum effect on capacitance created by the electrodes of the pressure transducer.

While I have shown and described specific embodiments of this invention, further modifications and improvements will occur to those skilled in the art. All such modifications which retain the basic underlying principles disclosed and claimed here are within the scope of this invention.

I claim:

1. A pressure transducer in which pressure changes displace a diaphragm whose position determines electrical characteristics of said transducer, comprising:

base substrate means having top and bottom substantially planar end surfaces, said top end surface having a substantially planar central portion;

flexible diaphragm means, relatively thin with respect to the distance between said top and bottom end surfaces, having a planar central portion and a peripheral portion;

mounting means for mounting said peripheral portion of said diaphragm means to said base substrate top surface, said mounting means, said diaphragm planar central portion and said substrate top surface planar portion generally forming an internal cavity, said diaphragm central portion being displaceable with respect to said top surface in response to pressure changes, and wherein said cavity maintains a fixed reference pressure and pressures applied exterior to said internal cavity cause said diaphragm means to flex and thereby alter electrical characteristics of said transducer in response to pressure changes;

said pressure transducer being a capacitive transducer having a first electrode on said top surface central planar portion of said base substrate and a second electrode on said diaphragm means planar central portion, said first and second electrodes directly facing each other across and separated from each other by a gap forming a portion of said internal cavity;

a metallic housing for said transducer; and wherein said diaphragm means has conductive guard electrode means extending over substantially all of said planar central portion of said diaphragm means for shielding against conductive elements exterior to said internal cavity and adjacent to said diaphragm means which may create variable effects in the electrical characteristics of said transducer;

said transducer including connecting means comprising a flexible conductive gasket located on a surface of said diaphragm means parallel to said planar central portion of said diaphragm means that forms a boundary for said internal cavity, and wherein said guard electrode means comprises a conductive metallization area substantially larger than said first electrode area and deposited on the surface of said diaphragm means in contact with said flexible conductive gasket, said conductive gasket electrically connecting said metallic housing and said guard electrode means.

2. A pressure transducer according to claim 1 wherein said diaphragm means is a disc-shaped ceramic plate and said base substrate means comprises a cylindrical shaped ceramic substrate.

3. A pressure sensor according to claim 2 wherein said mounting means comprises a annular glass ring bonding said diaphragm means to said base substrate top surface.

* * * * *